(12) United States Patent
Krishnan et al.

(10) Patent No.: US 9,961,120 B2
(45) Date of Patent: May 1, 2018

(54) SYSTEM AND METHOD FOR MANAGING CONCURRENT COMMUNICATIONS IN A CONTACT CENTER

(71) Applicant: Avaya Inc., Santa Clara, CA (US)

(72) Inventors: Parameshwaran Krishnan, Basking Ridge, NJ (US); Tony McCormack, Barna (IE); Navjot Singh, Somerset, NJ (US)

(73) Assignee: Avaya Inc., Santa Clara, CA (US)

( * ) Notice: Subject to any disclaimer, the term of this patent is extended or adjusted under 35 U.S.C. 154(b) by 201 days.

(21) Appl. No.: 14/872,956

(22) Filed: Oct. 1, 2015

(65) Prior Publication Data

US 2016/0212185 A1  Jul. 21, 2016

Related U.S. Application Data

(60) Provisional application No. 62/106,517, filed on Jan. 22, 2015, provisional application No. 62/105,436, filed on Jan. 20, 2015.

(51) Int. Cl.
*G06F 15/16* (2006.01)
*H04L 29/06* (2006.01)
*H04L 29/08* (2006.01)

(52) U.S. Cl.
CPC ........ *H04L 65/4015* (2013.01); *H04L 67/143* (2013.01)

(58) Field of Classification Search
CPC ......... H04M 3/5175; H04M 2203/402; H04M 3/5183; H04M 3/523; H04M 2203/408;
(Continued)

(56) References Cited

U.S. PATENT DOCUMENTS 6,167,395 A * 12/2000 Beck ................. G06F 17/30017
7,881,439 B1    2/2011 Cohn et al.
(Continued)

OTHER PUBLICATIONS

U.S. Appl. No. 11/244,358, filed Oct. 4, 2005, Uba.
U.S. Appl. No. 14/983,068, filed Dec. 29, 2015, Philonenko et al.

*Primary Examiner* — Peling Shaw
(74) *Attorney, Agent, or Firm* — Sheridan Ross P.C.

(57) ABSTRACT

A communication session is established with a contact center. The communication session includes a first concurrent communication session in a first communication medium and a second concurrent communication session in a second communication medium. The first communication medium and the second communication medium are different communication mediums. For example, the first concurrent communication session may be a voice communication session with a user and the second concurrent communication session may be multimedia communication session with the user. A task is identified that needs to be accomplished in the communication session (e.g., in one of first or second concurrent communication sessions). A determination is made if the first communication medium is an optimal communication medium for the task. In response to determining that the first communication medium is the optimal communication medium for the task, the first task is implemented in the first concurrent communication session.

20 Claims, 5 Drawing Sheets

(58) Field of Classification Search
CPC ... H04M 3/5166; H04M 3/5191; H04M 3/493
See application file for complete search history.

(56) References Cited

U.S. PATENT DOCUMENTS

| | | |
|---|---|---|
| 9,256,726 B2 | 2/2016 | Ordille et al. |
| 2007/0058637 A1 | 3/2007 | Lo |
| 2009/0161843 A1 | 6/2009 | Sylvain |
| 2009/0209239 A1* | 8/2009 | Montesdeoca ........ H04M 3/493 |
| | | 455/414.2 |
| 2010/0158236 A1 | 6/2010 | Chang et al. |
| 2010/0296643 A1 | 11/2010 | Athias |
| 2010/0310057 A1 | 12/2010 | Theppasandra et al. |
| 2011/0051918 A1* | 3/2011 | Fan .................... H04M 3/5166 |
| | | 379/211.02 |
| 2011/0286586 A1 | 11/2011 | Saylor et al. |
| 2012/0076283 A1 | 3/2012 | Ajmera et al. |
| 2012/0190333 A1 | 7/2012 | Portman et al. |
| 2012/0215535 A1 | 8/2012 | Wasserblat et al. |
| 2014/0119531 A1 | 5/2014 | Tuchman et al. |
| 2014/0192971 A1 | 7/2014 | Sri et al. |
| 2014/0250227 A1 | 9/2014 | Slovacek |
| 2015/0350435 A1* | 12/2015 | Connolly ........... G06Q 30/0631 |
| | | 379/265.03 |

* cited by examiner

SYSTEM AND METHOD FOR MANAGING CONCURRENT COMMUNICATIONS IN A CONTACT CENTER

CROSS REFERENCE TO RELATED APPLICATIONS

This application claims the benefit under 35 U.S.C. § 119(e) of U.S. Provisional Application No. 62/106,517, filed Jan. 22, 2015, entitled "USING SIMULTANEOUS MULTI-CHANNEL FOR CONTINUOUS AND TIMELY FEEDBACK ABOUT AGENT PERFORMANCE DURING A CUSTOMER INTERACTION," and U.S. Provisional Application No. 62/105,436, filed Jan. 20, 2015, entitled "MODE INTEGRATION IN CUSTOMER ACCESS," the entire disclosures of which are incorporated herein by reference.

TECHNICAL FIELD

The systems and methods disclosed herein relate to contact centers and in particular to management of electronic communication sessions in a contact center.

BACKGROUND

Contact centers typically operate on a model where customer issues are handled separately. Likewise, customer communication sessions in different mediums are tracked and considered separate communication sessions. Even though a customer may be engaged in separate communication sessions with the contact center concurrently, current contact centers fail to leverage this information. This results in inefficiencies in managing the contact center.

SUMMARY

Systems and methods are provided to solve these and other problems and disadvantages of the prior art. A communication session is established with a contact center. The communication session includes a first concurrent communication session in a first communication medium and a second concurrent communication session in a second communication medium. The first communication medium and the second communication medium are different communication mediums. For example, the first concurrent communication session may be a voice communication session with a user and the second concurrent communication session may be multimedia communication session with the user. A task is identified that needs to be accomplished in the communication session (e.g., in one of first or second concurrent communication sessions). A determination is made if the first communication medium is an optimal communication medium for the task. In response to determining that the first communication medium is the optimal communication medium for the task, the first task is implemented in the first concurrent communication session. For example, if the task is to get a long product serial number (e.g., 25 characters in length), the optimal communication medium may be the multimedia communication channel.

In an alternative embodiment, a user input is received for a plurality of tasks. For example, a user at an Interactive Voice Response (IVR) system provides input to get information on two completely different products. A determination is made that each of the plurality of tasks requires different contact center agent skills to perform the plurality of tasks. A determination of an optimal communication medium for each of the plurality of tasks is made in response to determining that each of the plurality of tasks requires different contact center agent skills to perform the plurality of tasks. A plurality of concurrent communication sessions are initiated to a contact center to perform the plurality of tasks. The plurality of concurrent communication sessions are in the optimal communication mediums.

DETAILED DESCRIPTION

Figure 1:
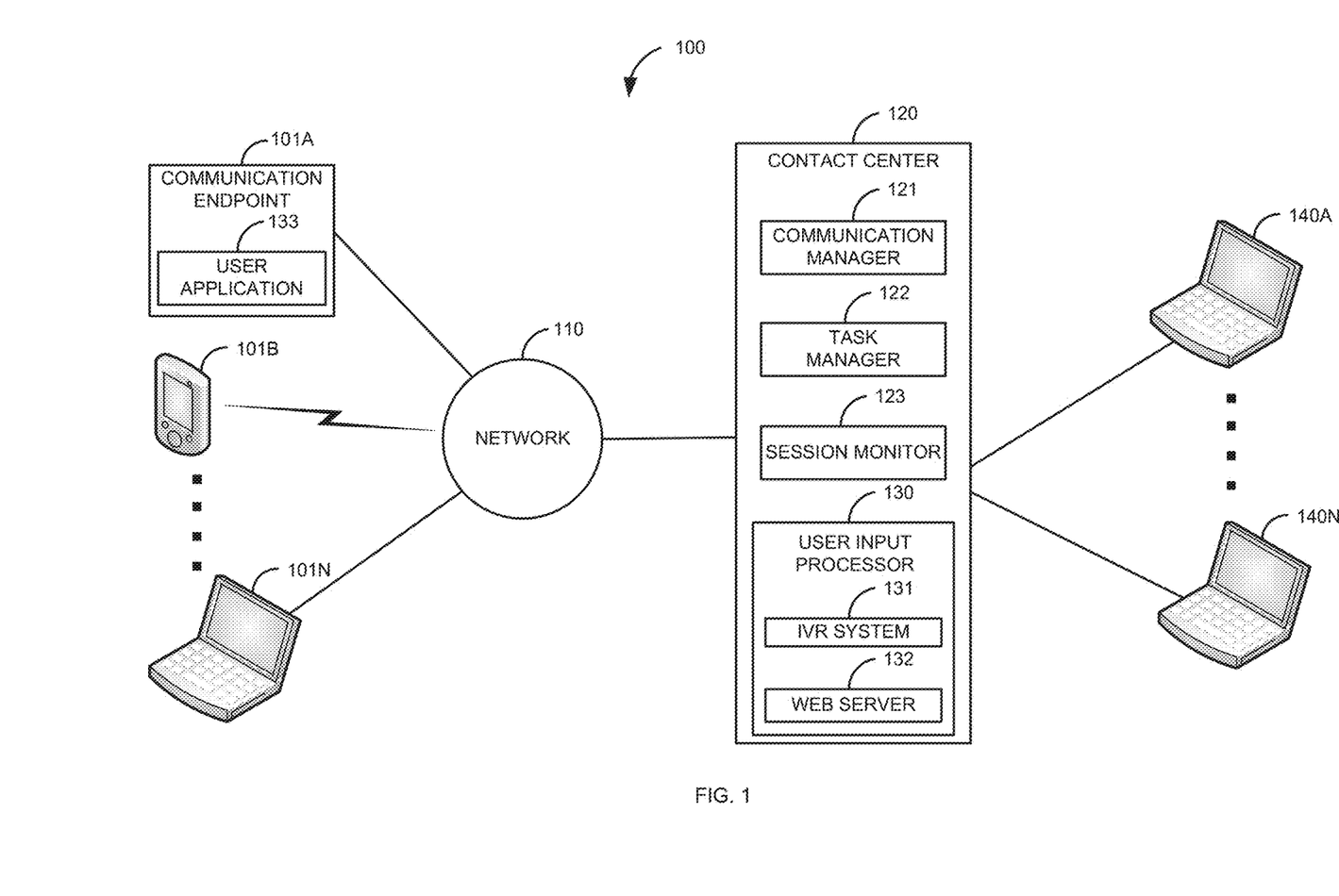
FIG. 1 is a block diagram of a first illustrative system for managing concurrent communications in a contact center.

FIG. 1 is a block diagram of a first illustrative system 100 for managing concurrent communications in a contact center 120. The first illustrative system 100 comprises communication endpoints 101A-101N, a network 110, the contact center 120, and agent terminals 140A-140N.

The communication endpoints 101A-101N can be or may include any user device that can communicate on the network 110, such as a Personal Computer (PC), a telephone, a video system, a cellular telephone, a Personal Digital Assistant (PDA), a tablet device, a notebook device, a smart phone, and/or the like. As shown in FIG. 1, any number of communication endpoints 101A-101N may be connected to the network 110, including only a single communication endpoint 101.

The communication endpoint 101A further comprises a user application 133. The user application 133 can be any software that is loaded onto the communication endpoint 101 that can be used to send information to and receive information from the user. Although not shown, the user application may or may not be included in the communication endpoints 101B-101N.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), and the like. Thus, the network 110 is an electronic communication network configured to carry messages via packets and/or circuit switched communications.

The contact center 120 can be or may include any hardware coupled with software that can manage various communications in the contact center 120, such as a Private Branch Exchange (PBX), a central office switch, a router, an email system, an Instant Messaging (IM) system, a video switch, a text messaging system, a combination of these, and the like. The contact center 120 further comprises a communication manager 121, a task manager 122, a session monitor 123, and a user input processor 130.

The communication manager 121 can be or may include any hardware coupled with software that routes communications in the contact center 120, such as a PBX, a switch, a video switch, an IM system, an email system, a text messaging system, a combination of these, and the like. The communication manager 121 may be distributed in the network 110 and/or in the contact center 120. The communication manager 121 can manage various types of communications, such as voice communications, video communications, email communications, IM communications, text messaging communications, virtual reality communications, multimedia communications, and/or the like.

The task manager 122 can be or may include any hardware/software that can manage various tasks/events in the contact center 120. A task is an event that can occur in a communication. The tasks may be implemented in different types of communication media, such as voice, video, text, email, IM, virtual reality, and/or the like.

The session monitor 123 can be or may include any hardware/software that can monitor a communication session for specific events, such as a Digital Signaling Processor (DSP), voice recognition software, gesture recognition hardware/software, a text analysis module, and/or the like. The session monitor 123 can monitor a variety of communication sessions, such as voice communication sessions, video communications, text messaging communications, email communications, IM communications, virtual reality communications and/or the like. The session monitor 123 can monitor multiple communication sessions concurrently. The concurrent communication sessions may be in the same or different communication mediums, such as voice, video, email, text, IM, virtual reality, and/or the like.

The user input processor 130 can be or may include any hardware coupled with software that can present and process information from a user. The user input processor 130 can process input from various types of communication mediums, such as voice, video, text, email, IM, virtual reality, and/or the like. The input processor further comprises an Interactive Voice Response (IVR) system 131 and a web server 132. The user input processor 130 may also include the user application 133.

The IVR system 131 can be or may include any hardware/software that can interact with a user. The IVR system 131 may provide voice and/or video information to a user and receive voice and/or video information from a user.

The web server 132 can be any hardware/software that can present information to a user and receive input from a user. The web server 132 can use a variety of protocols and web pages to present and receive input from the user.

The agent terminals 140A-140N can be any device that can be used by a contact center agent to communicate with a user, such as the communication endpoint 101. The agent terminals 140A-140N can comprise a plurality of communication endpoints 101, such as a telephone and a personal computer. The agent terminals 140A-140N can comprise any number of agent terminals 140 from 1 to N, where N is an integer.

Figure 2:
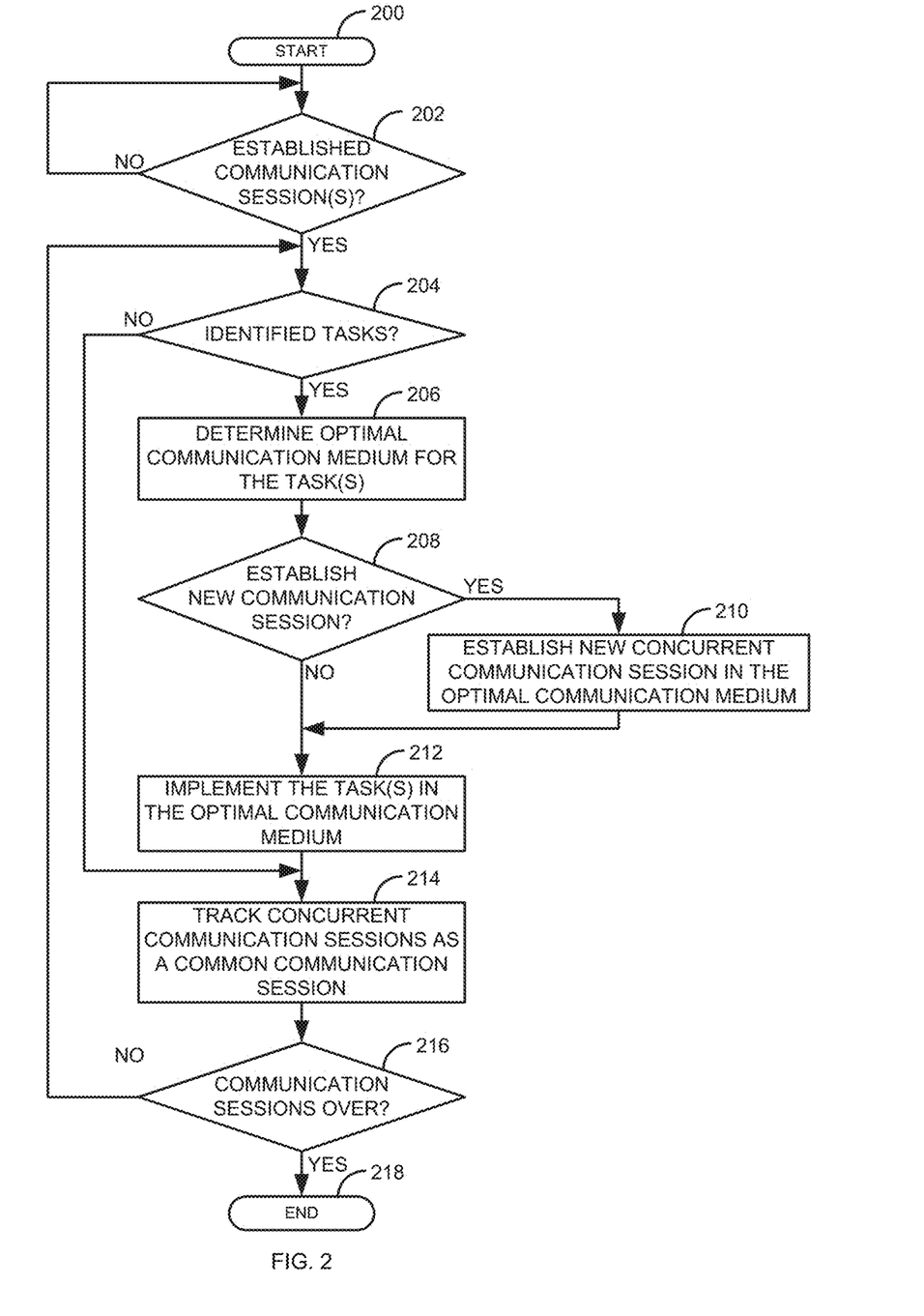
FIG. 2 is a flow diagram of a process for managing concurrent communications in a contact center.

FIG. 2 is a flow diagram of a process for managing concurrent communications in a contact center 120. Illustratively, the communication endpoints 101A-101N, the contact center 120, the communication manager 121, the task manager 122, the session monitor 123, the user input processor 130, the IVR system 131, the web server 132, the user application 133, and the agent terminal 140A-140N are stored-program-controlled entities, such as a computer or processor, which performs the method of FIGS. 2-5 and the processes described herein by executing program instructions stored in a non-transitory computer readable storage medium, such as a memory or disk. Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process starts in step 200. The communication manager 121 determines if there are one or more established communication sessions between a user of a communication endpoint 101 and the contact center 120 in step 202. For example, the user of the communication endpoint 101A may only have a video communication session established to a contact center agent at the agent terminal 140A. Alternatively, the user of the communication endpoint 101A may have a concurrent voice communication session and an IM communication session with a contact center agent at the agent terminal 140A. If there is not an established communication session between the user and the contact center 120 in step 202, the process repeats step 202.

Otherwise, if one or more communication sessions have been established in step 202, the task manager 122 determines if there are any identified tasks that need to be accomplished in the communication session(s) in step 204. A task can be any event that needs to be accomplished in the one or more communication sessions. For example, a task may be capturing specific information, presentation of specific information, monitoring a communication session for a specific event or agenda item, detection of an availability of a communication medium, receiving specific items, sending specific items, a size of information, a type of information, a language of information, an accuracy of information, a number of words, a number of characters, a time, a visual representation, and/or the like. A task can be generated based on an event.

The task is typically identified after the communication session has been established (but does not have to be). For example, a contact center agent may request that the user provide a specific item (a task) in a voice communication session, such as a warranty certificate or a long product serial number. The task can be detected in various ways, such as, detection of a word or phrase spoken in the communication session, via an input from a contact center agent (e.g., the contact agent may click on a button/menu item to request the serial number/warranty certificate from the customer), via input from the user (e.g., the user selects a menu item), and/or the like.

A communication session can include multiple tasks that need to be identified. For example, the task manager 122 may identify two tasks to be accomplished in a voice communication session, such as to get a product serial number and to send a manual to a customer. The tasks can occur at different times during the communication session, such as at the beginning of the communication session, during the communication session, and/or at the end of a communication session.

The tasks can be identified by various devices, such as the IVR system 131, the web server 132, the user application 133, and/or the like. A user at the IVR system 131, the web server 132, and/or user application 133 can input information that is used to establish the communication sessions of step 202. For example, a user can call the contact center 120 (i.e., via the user application 133) and be directed to the IVR system 131. The user then selects IVR menus that identify a product and a request to talk to a contact center agent about a product. In response, the communication manager 121 establishes a voice communication session with the user/contact center agent and establishes a multimedia communication session with the user application 133.

If a task has not been identified in step 204, the process goes to step 214 where the concurrent communication sessions are tracked as a common communication session (if there are concurrent communication sessions at this point) of the user. Otherwise, if a task has been identified in step 204, the task manager 122 determines the optimal communication medium for the task in step 206. For example, if the task is to request a product serial number, based on the size of the serial number (e.g., 25 characters), the task manager 122 may determine that the optimal communication medium may be a multimedia communication medium via the web server 132 or the user application 133 (instead of a voice communication medium).

If the task requires that a new communication session be established in a new communication medium (i.e., the optimal communication medium) in step 208, the communication manager 121 establishes a new communication session in the optimal communication medium in step 210 and the process goes to step 212. Otherwise, if a communication session in the optimal communication media is already established in step 208, the process goes to step 212.

The task manager 122 implements the task(s) in the optimal communication medium in step 212. For example, if the task was for a contact center agent to send a manual to a customer, the task manager 122 may bring up an email send page with the customer's email address and the manual already in the email as an attachment.

The task manager 122 tracks the concurrent communication sessions as a common communication session of the user in step 214. For example, the task manager 122 can track the concurrent communications sessions using a global identifier, a customer identifier, and/or the like.

The communication manager 121 determines, in step 216 if the concurrent communication sessions are over. If the concurrent communication sessions are not over in step 216, the process goes back to step 204 where additional tasks/new communication sessions may be established. Otherwise, if the concurrent communication sessions are over in step 216, the process ends in step 218.

To illustrate, consider the following examples. A user of the communication endpoint 101A uses a web browser to access the web server 132. The user selects a link on a web page to talk to an agent in the contact center 120. A video communication session is established between the user and a contact center agent in step 202. During the call, the video call, the session monitor 123 monitors the video communication session and identifies that the user wants to return a product that the customer purchased (step 204). The task manager 122 determines that the task of returning the product requires that the customer attach a tracking label to the returned product. In response, the task manager 122 determines that the optimal medium is to send the tacking label via an IM session (step 206). The task manager 122 automatically (or with approval by the contact center agent) establishes a concurrent IM communication session between the user and the contact center agent (steps 208/210). The attachment that contains the tracking label is automatically sent in the IM session by the communication manager 121 to the user (step 212). The user acknowledges receipt of the attachment in the IM session to the contact center agent. The video communication session and the IM communication session are tracked as concurrent communication sessions (step 214). The communication sessions are over in step 216 and the process ends in step 218.

A user via the user application 133 selects that the user wants to discuss purchasing Product X. As a result chat session is established between a contact center agent and the user (step 202). During the discussion, it is determined that the user wants to purchase Product X (step 204), but would like to make payments. In response, the user application 133 directs the user to a web page provided by the web server 132 to establish a concurrent multimedia communication session (step 206-212). The user enters information (e.g., credit information) in regard to making payments for Product X while being assisted by the contact center agent via the chat session. The multimedia communication session and the chat communication session are tracked as a common communication session (step 214).

A communication session (i.e., a workflow) may have multiple tasks, and the knowledge that there are multiple communication sessions or that multiple communication sessions have been added can be used to position tasks and change the communication session to run in parallel along with knowledge of dependency between the tasks in the communication sessions. There are different ways that a communication channel may be identified for a particular task. For example, this may be done programmatically, based on data collected from earlier interactions, from user or administrator profiled profile, a library, and/or the like.

Figure 3:
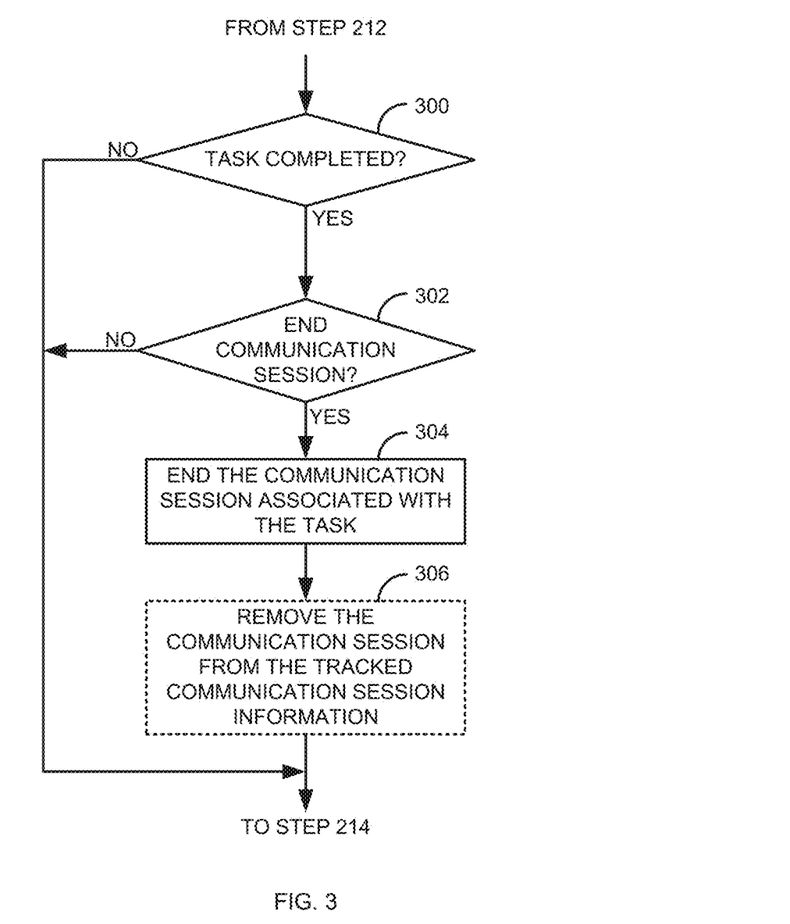
FIG. 3 is a flow diagram of a process for ending a concurrent communication session based on completion of a task.

FIG. 3 is a flow diagram of a process for ending a concurrent communication session based on completion of a task. The process of FIG. 3 goes between steps 212 and 214 of FIG. 2. After implementing the tasks in the optimal communication medium in step 212, the task manger 122 determines, in step 300, if the task has been completed. For example, if the task was for the user to provide a product serial number, the task manager 122 can determine that the task has been completed when the user submits the product serial number (e.g., by the user clicking on a send button). If the task has not been completed in step 300, the process goes to step 214.

Otherwise, if the task has been completed in step 300, the communication manger 121 determines in step 302 if the communication session associated with the task needs to end. For example, if the task was to submit the product serial number, the communication processor 121 may automatically end the multimedia communication session because multimedia communication session is no longer necessary. Alternatively, the communication may not end because additional information may need to be sent/received in the particular medium. Step 302 may be based on defined or administered configuration information. If the communication session is not to end in step 302, the process goes to step 214.

Otherwise, if the communication session is to end in step 302, the communication processor 121 ends the communication session associated with the task in step 304. The communication session may be ended automatically or based on other factors, such as input from a contact center agent, input from the user, input from other processes, and/or the like. The communication processor 121 can optionally remove the communication session from the tracked common communication session information in step 306. The process then goes to step 214.

Figure 4:
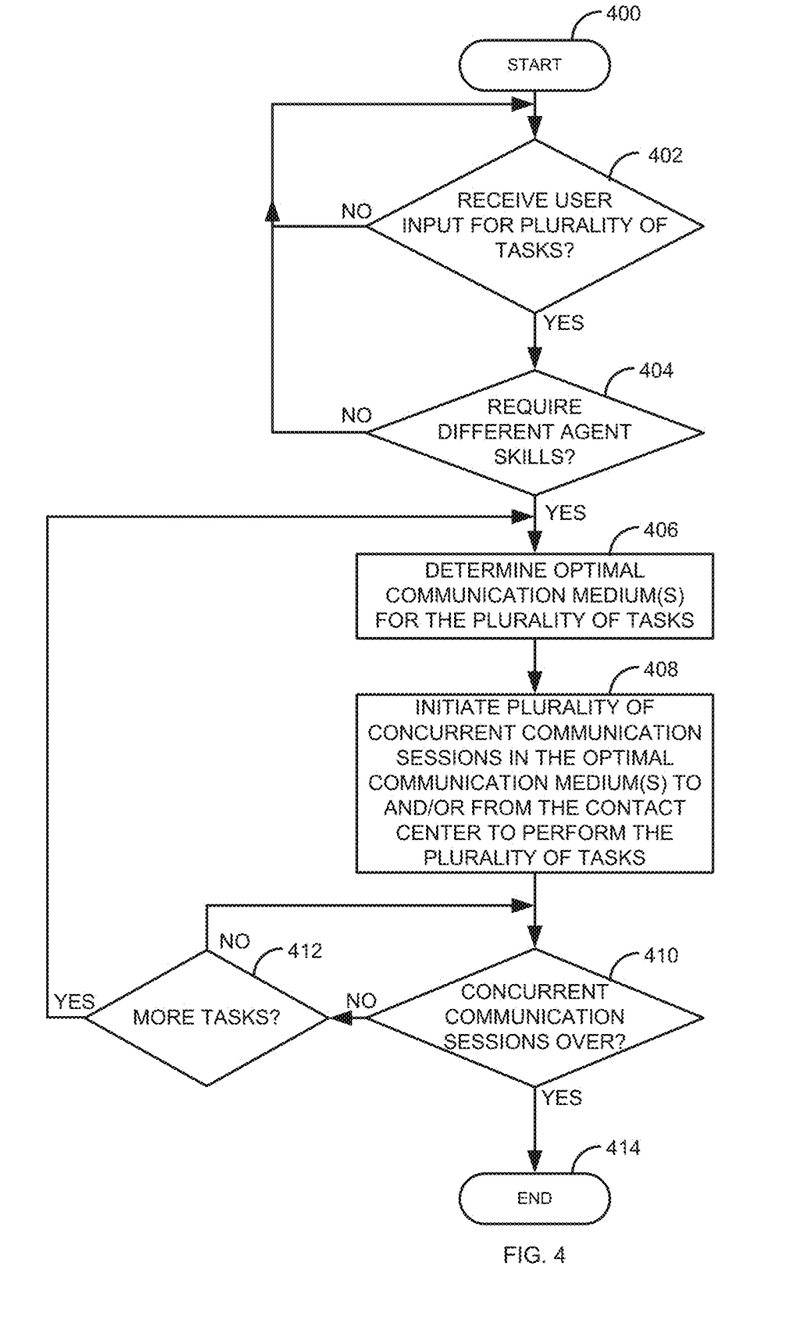
FIG. 4 is a flow diagram of a process for establishing and managing concurrent communication sessions in a contact center.

FIG. 4 is a flow diagram of a process for establishing and managing concurrent communication sessions in a contact center 120. The process starts in step 400. The user input processor 130 waits to receive input from a user for a plurality of tasks in step 402. For example, the IVR system 131 can wait to receive a response from a user. If the input for a plurality of tasks is not received in step 402, the process repeats step 402. If the input for the plurality of tasks is received in step 402, the input processor 130 determines, in step 404, if each of the plurality of tasks requires different contact center agent skills to perform the plurality of tasks in step 404. A contact center agent skill can be any skill that is assigned to a contact center agent, such as, a skill for a specific product, a skill for a specific service, a skill for a specific system, a specific technical skill, a general skill, and/or the like. If the tasks do not require different contact center agents skills in step 404, the process goes back to step 402.

Otherwise, if the tasks require different contact center agent skills in step 404, the task manager 122 determines the optimal communication medium for the plurality of tasks in step 406. The communication manager 121 initiates a plurality of concurrent communication sessions in the optimal communication medium(s) to and/or from the contact center 120 to perform the plurality of tasks in step 408. For example, based on input to the IVR system 131 or from a web page, the communication manager 121 can initiate two concurrent communication sessions in different communication mediums (or the same communication medium) to two different contact center agents.

The communication manager 121 determines in step 410 if the concurrent communication sessions are over. If the concurrent communication sessions are over in step 410, the process ends in step 414. Otherwise, if the concurrent communication sessions are not over in step 410, the task manager 122 determines in step 412 if there are more tasks. If there are no more tasks in step 412, the process goes to step 410. Otherwise, if there are more tasks in step 412, the process goes back to step 406.

The two communication sessions may be two instances in the same medium. For example, both communication mediums may be chat sessions. The communication mediums may sometimes be sequential or done in parallel.

To illustrate the process of FIG. 4, consider the following example. A user calls into the IVR system 131. The user, via the IVR system 131 indicates that he wants to discuss with an agent about purchasing product X. The user also indicates that he wants to discuss extending his warranty for product Y (steps 402-404). Products X and Y are different products that are handled by different agents with different agent skills. The task manager 122 determines that the optimal communication medium for purchasing product X is a chat session and the optimal communication medium for product Y is voice (step 406). The communication processor 121 initiates a chat communication session to the user with agent A to discuss product X and establishes a voice communication session for product Y with agent B (step 408).

Figure 5:
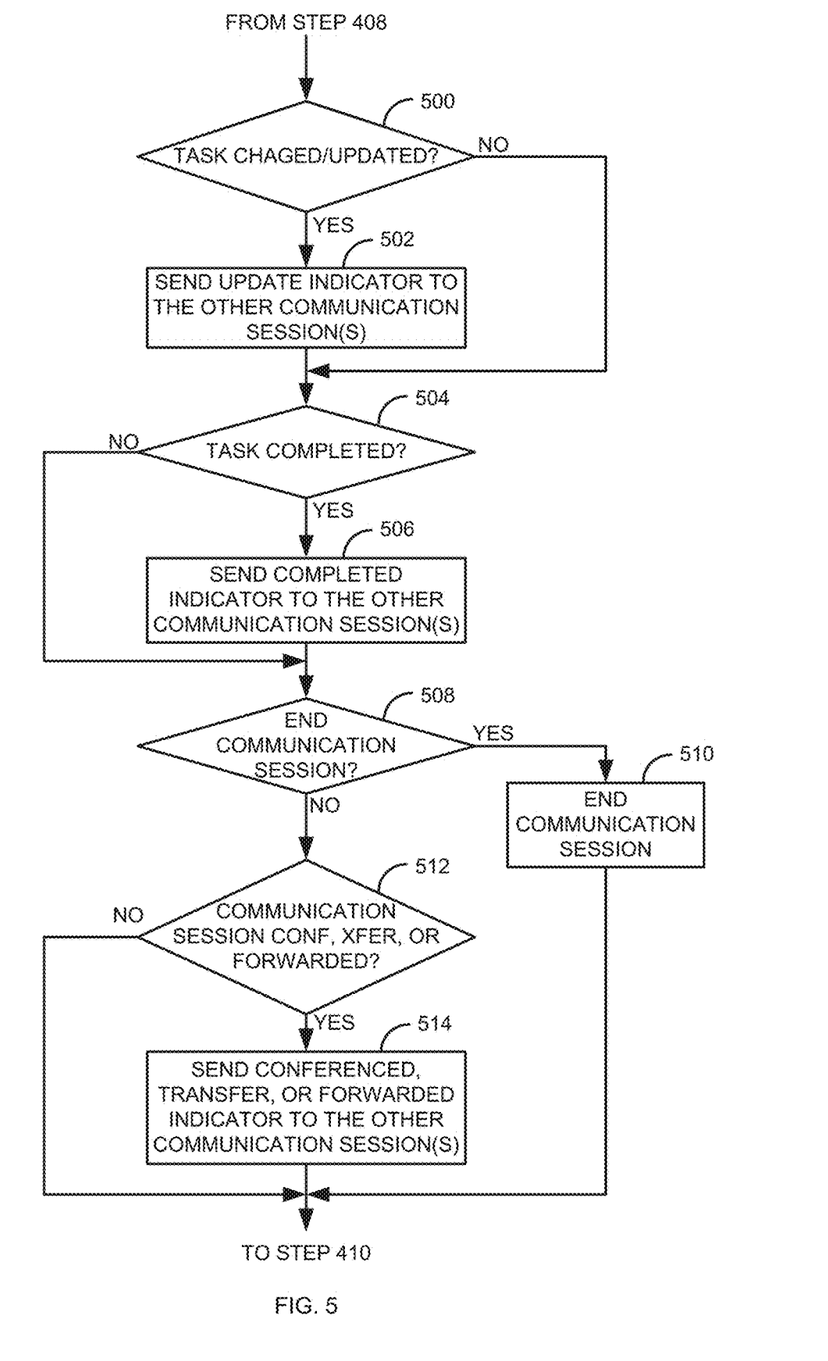
FIG. 5 is a flow diagram for sending information between concurrent communication sessions.

FIG. 5 is a flow diagram for sending information between concurrent communication sessions. The process of FIG. 5 goes between steps 408 and 410 of FIG. 4. After initiating the plurality of concurrent communication sessions in step 408, the task manager 122 determines if any of the tasks have changed and/or have been updated in step 500. For example, if the task is for the user to fill out a survey, the task may be updated as the user completes each page of the survey. Alternatively, based on input from the user and/or contact center agent, a task may be changed. For example, the task may be to discuss product X, but after discussion, the user may now want to purchase product Y. If the task has not changed or been updated in step 500, the process goes to step 504. Otherwise, if the task has been changed and/or updated in step 500, the communication manager 121 sends an update indicator to the other communication session(s) in step 502 and the process goes to step 504. For example, the communication manager 121 sends an update indicator that the user has decided to purchase product Y instead of product X to the contact center agent handling the other communication session.

In one embodiment, the update indicator of step 502 may be sent specific ones of the other communication sessions. For example, if there were two other communication sessions, the update indicator may be sent to only one of the other two communication sessions.

The task manager 122 determines in step 504 if the task has been completed. If the task has not been completed in step 504, the process goes to step 508. Otherwise, if the task has been completed in step 504, the task manager 122 sends an indicator to the other communication session(s) that the task has been completed in step 506. For example, if the task was to get information on Product X from contact center agent A, the task manager 122 can send a message to a contact center agent B, who is currently engaged in an IM session for Product Y that the task to get information on Product X has been completed. This information can be used by the contact center agent B to make sure that all the customer's needs were met. For example, the contact center agent B can ask the customer if he/she was satisfied with the information provided for Product X when the contact center agent B has completed the discussion of Product Y.

In one embodiment, the completed indicator of step 506 may be sent to specific ones of the other communication sessions. For example, if there were two other communication sessions, the completed indicator may be sent to only one of the other two communication sessions.

The communication manager 121 determines in step 508 if the communication session for the task has ended. If the communication session for the task is to end in step 508, the communication manger 121 ends the communication session for the task in step 510 and the process goes to step 410. The communication session may or may not end when the task is completed. For example, if the task was to get a manual for Product Y via an IM communication session, the IM communication session may automatically end once the manual for Product Y has been sent.

If the communication session for the task is not to end in step 508, the communication manager 121 determines in step 512 if the communication session was conferenced, transferred, or forwarded in step 512. If the communication session was conferenced, transferred, or forwarded in step 514, the task manager 122 sends a conferenced, transferred, or forwarded indicator to the other communication session(s) in step 514 and the process goes to step 410. For example, if a supervisor was conferenced onto a communication session, a message indicating that the supervisor was conferenced is sent to the other communication session(s) (e.g., a contact center agent). The contact center agent can then use this information in the other communication session. For example, to ask the customer if the supervisor helped resolve the customer's problem. Otherwise, if the communication session is not conferenced, transferred, or forwarded the process goes to step 410

In one embodiment, the conferenced/transferred/forwarded indicator of step 512 may be sent to specific ones of the other communication sessions. For example, if there were two other communication sessions, the conferenced/transferred/forwarded indicator may be sent to only one of the other two communication sessions.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A system for managing concurrent communication sessions in a contact center comprising:
   a communication manager that determines that a communication session has been established with the contact center, wherein the communication session comprises a first concurrent communication session in a first communication medium with a user and a second concurrent communication session in a second communication medium with the user, and wherein the first communication medium and the second communication medium are in different communication mediums; and
   a task manager that identifies a first task that needs to be accomplished in the communication session, determines if the first communication medium is an optimal communication medium for the first task, wherein the first communication medium is determined to be the optimal communication medium for the first task based on a size and/or type of information to send, received, and/or present to the user, and implements the first task in the first concurrent communication session in response to determining that the first communication medium is the optimal communication medium for the first task.

2. The system of claim 1, wherein the communication manager tracks the first concurrent communication session and the second concurrent communication session as a common communication session of the user.

3. The system of claim 1, wherein:
   the task manager determines that the first task has been completed; and
   the communication manager automatically ends the first concurrent communication session in response determining that the first task has been completed, and removes the first concurrent communication session from the tracked common communication session in response to automatically ending the first concurrent communication session.

4. The system of claim 1, wherein the task manager: identifies a second task that needs to be accomplished in the communication session, wherein the first and second tasks are determined after establishment of the first and second concurrent communication sessions, determines if the second communication medium is an optimal communication medium for the second task, and implements the second task in the second concurrent communication session in response to determining that the second communication medium is the optimal communication medium for the second task.

5. The system of claim 1, wherein the first task is identified based on user input from at least one of: an Interactive Voice Response (IVR) system, a web page, and an application on a communication endpoint.

6. The system of claim 5, wherein the first concurrent communication session and the second concurrent communication session are established based on the user input.

7. The system of claim 1, wherein the communication manager establishes the first communication session in the first communication medium in response to determining that the first communication medium is the optimal communication medium for the first task.

8. The system of claim 1, wherein the amount and/or type of information to send, receive, and/or present to the user is the amount of information and wherein the amount of information is at least one of a number of characters for the user to enter or a number of words for the user to enter.

9. The system of claim 1, wherein the amount and/or type of information to send, receive, and/or present to the user is the type of information, wherein the type of information is at least one of sending a document to the user, the user sending a document to the contact center, and the user sending a warranty certificate to the contact center.

10. The system of claim 1, wherein the amount and/or type of information to send, receive, and/or present to the user is the amount and/or type of information presented to the user.

11. The system of claim 1, wherein the first concurrent communication session is between the user and a first human contact center agent, wherein the second concurrent communication session is between the user and the first human contact center agent or a second human contact center agent.

12. A method for managing concurrent communication sessions in a contact center comprising:
    determining that a communication session has been established with the contact center, wherein the communication session comprises a first concurrent communication session in a first communication medium with a user and a second concurrent communication session in a second communication medium with the user, and wherein the first communication medium and the second communication medium are in different communication mediums;
    identifying a first task that needs to be accomplished in the communication session;
    determining if the first communication medium is an optimal communication medium for the first task, wherein the first communication medium is determined to be the optimal communication medium for the first task based on a size and/or type of information to send, receive, and/or present to the user; and
    in response to determining that the first communication medium is the optimal communication medium for the first task, implementing the first task in the first concurrent communication session.

13. The method of claim 12, further comprising:
    determining that the first task has been completed;
    in response to determining that the first task has been completed, automatically ending the first concurrent communication session; and
    in response to automatically ending the first concurrent communication session, removing the first concurrent communication session from a tracked common communication session.

14. The method of claim 12, further comprising:
    identifying a second task that needs to be accomplished in the communication session;
    determining if the second communication medium is an optimal communication medium for the second task; and
    in response to determining that the second communication medium is the optimal communication medium for the second task, implementing the second task in the second concurrent communication session.

15. The method of claim 12, wherein the first concurrent communication session and the second concurrent communication session are established based on user input.

16. The method of claim 12, further comprising: establishing the first communication session in the first communication medium in response to determining that the first communication medium is the optimal communication medium for the first task.

17. The method of claim 12, wherein the amount and/or type of information to send, receive, and/or present to the user is the type of information and wherein the type of information is at least one of: a language of the information and an accuracy of the information.

18. A system for managing concurrent communication sessions in a contact center comprising:
   a user input processor that receives input from a user for a plurality of tasks and determines that each of the plurality of tasks requires different contact center agent skills to perform the plurality of tasks;
   a task manager that determines an optimal communication medium for each of the plurality of tasks in response to determining that each of the plurality of tasks requires different contact center agent skills to perform the plurality of tasks; and
   a communication manager that initiates a plurality of concurrent communication sessions to and/or from the contact center to perform the plurality of tasks, wherein the plurality of concurrent communication sessions are in the optimal communication mediums and wherein at least one of the plurality of concurrent communication sessions in the optimal communication medium for a first task of the plurality of tasks based on a size and/or type of information to send, receive, and/or present to the user.

19. The system of claim 18, wherein the plurality of concurrent communication sessions are with different contact center agents and wherein the task manager determines that a first task has been completed in a first one of the plurality of concurrent communication sessions, sends an indicator to at least a second one of the plurality of concurrent communication sessions that the first task has been completed in the first one of the plurality of communication sessions in response to determining that the first task has been completed in the first one of the plurality of concurrent communication sessions.

20. The system of claim 18, wherein one of the plurality of concurrent communication sessions is one of transferred, forwarded, or conferenced and wherein the task manager sends an indicator to the other ones of the plurality of communication sessions that indicates the one of the plurality of concurrent communication sessions has been transferred, forwarded, or conferenced.

* * * * *

UNITED STATES PATENT AND TRADEMARK OFFICE
CERTIFICATE OF CORRECTION

PATENT NO. : 9,961,120 B2
APPLICATION NO. : 14/872956
DATED : May 1, 2018
INVENTOR(S) : Parameshwaran Krishnan, Tony McCormack and Navjot Singh Page 1 of 1

It is certified that error appears in the above-identified patent and that said Letters Patent is hereby corrected as shown below:

In the Claims

Column 9, Line 31, Claim 1 delete "received" and replace it with --receive-- therein.

Signed and Sealed this
Fourth Day of September, 2018

Andrei Iancu
*Director of the United States Patent and Trademark Office*